CRADLE SWITCH ASSEMBLY FOR TELEPHONE INSTRUMENTS

Filed Nov. 30, 1960 3 Sheets-Sheet 1

INVENTORS
OSKAR EDVIN RUDOLF NORDSTRÖM
PER OLOF RAGNAR PERSSON
BY Hane and Nydick
ATTORNEYS Sept. 29, 1964 O. E. R. NORDSTRÖM ETAL 3,151,222

CRADLE SWITCH ASSEMBLY FOR TELEPHONE INSTRUMENTS

Filed Nov. 30, 1960 3 Sheets-Sheet 2

INVENTORS
OSKAR EDVIN RUDOLF NORDSTRÖM
PER OLOF RAGNAR PERSSON
BY Hane and Nydick
ATTORNEYS Sept. 29, 1964 O. E. R. NORDSTRÖM ETAL 3,151,222

CRADLE SWITCH ASSEMBLY FOR TELEPHONE INSTRUMENTS

Filed Nov. 30, 1960 3 Sheets-Sheet 3

INVENTORS
OSKAR EDVIN RUDOLF NORDSTRÖM
PER OLOF RAGNAR PERSSON

BY Hane and Nydick
ATTORNEYS

United States Patent Office 3,151,222
Patented Sept. 29, 1964

3,151,222

CRADLE SWITCH ASSEMBLY FOR TELEPHONE INSTRUMENTS

Oskar Edvin Rudolf Nordström, Hagersten, and Per Olof Ragnar Persson, Linkoping, Sweden, assignors to Telefonaktiebolaget L M Ericsson, Stockholm, Sweden, a corporation of Sweden Filed Nov. 30, 1960, Ser. No. 72,615
Claims priority, application Sweden Dec. 12, 1959
8 Claims. (Cl. 179—164)

The invention refers to cradle-switches for telephone instruments of the type where a bracket pivotally mounted in the frame of the instrument is actuated upon lifting and replacing of the handset and thereby actuates the contact spring set arranged for switching between the speech and signal positions of the instrument. The bracket and the frame are usually punched out of sheet metal. The bracket is pivoted in the frame in two knife-edge bearings, each of which consists of a plate edge of the bracket, which rests in a recess made in the frame, at which said edges engage the recesses by spring force.

The spring (or springs) which holds the bracket in engagement with the frame serves also as a restoring spring when the bracket is rocked so that the bracket is always restored to the same initial position when the handset is lifted. The force of the restoring spring necessary for this purpose is relatively great, and said force will dominate when the forces working on the bracket are combined to a resultant acting at the pivoting points. A relatively high pressure will occur in the bearings and great demands must therefore be made on the shaping of the bearing.

The knife-edge bearings of this kind, which are known up to now, entail relatively great friction losses, furthermore the bearing is relatively soon worn out. The purpose of the present invention is to obtain a bearing which affords the advantage of low friction losses by using simple and cheap means, and this is done by giving the edge of the bracket, which rests in the recess, a rounded shape so that it can roll in said recess upon movement of the bracket and by placing a bearing lining on at least two contiguous edges in the recess. Said bearing lining is so shaped that in the part of the bearing lining against which said rounded edge rests, it has a curvature radius which is greater than the curvature radius on said rounded edge. The spring force is so dimensioned and directed that the resultant of this force and the other forces acting on the bracket (preferably the force caused by the contact springs and the weight of the handset) has an acting direction which generally coincides with the direction of the bisector of the angle which is formed by said two contiguous edges in the recess.

Figure 1:
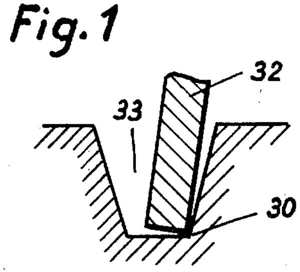
Figure 3:
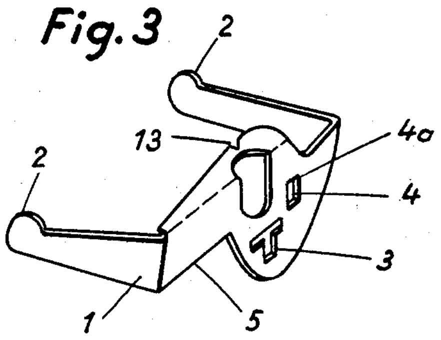
Figure 2:
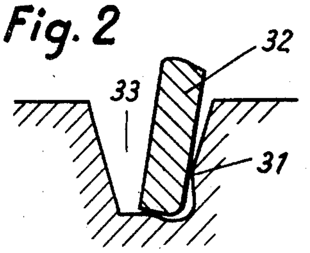
Figure 4:
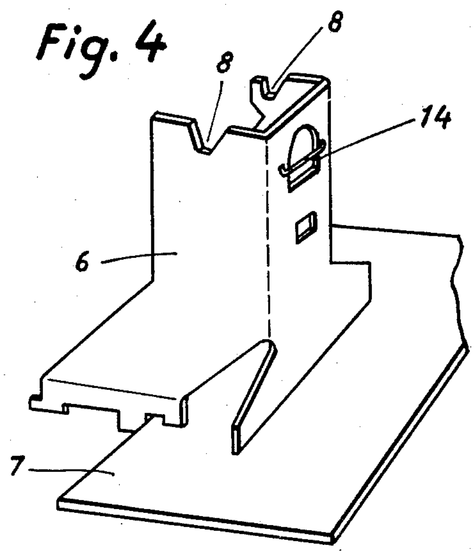
Figure 5:
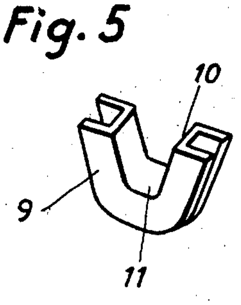
Figure 6:
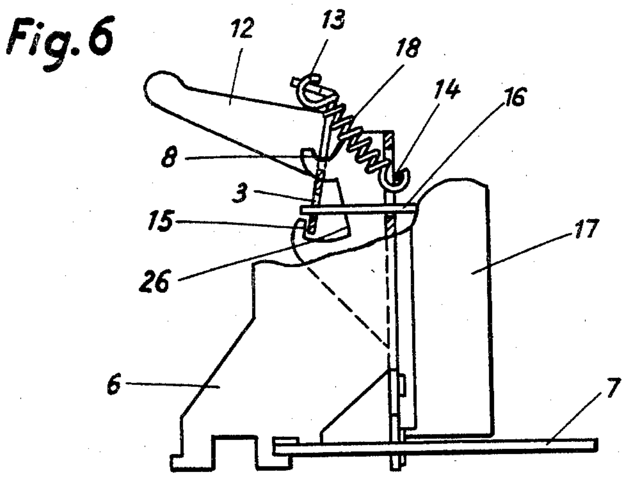
Figure 7:
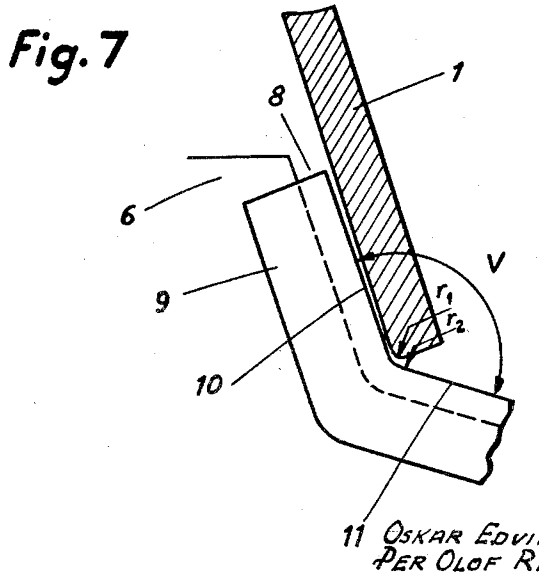
Figure 8:
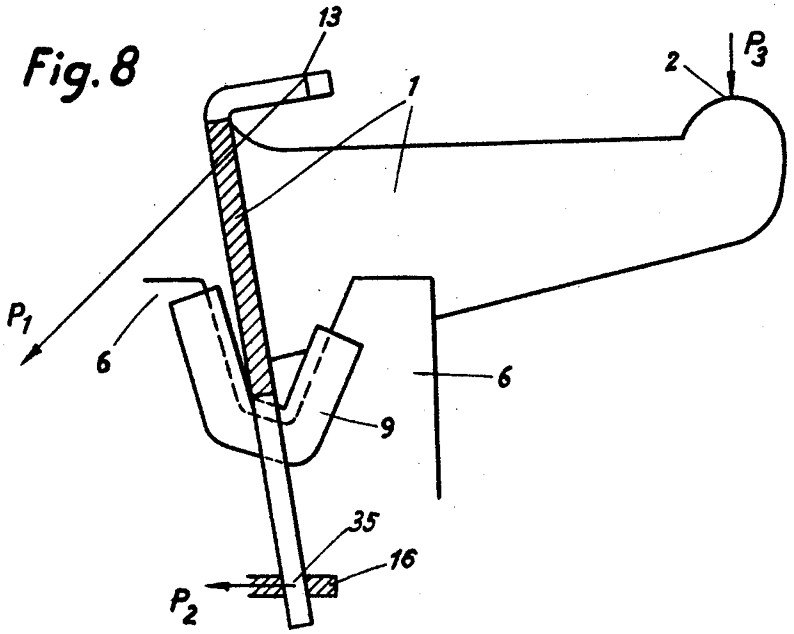
Figure 9:
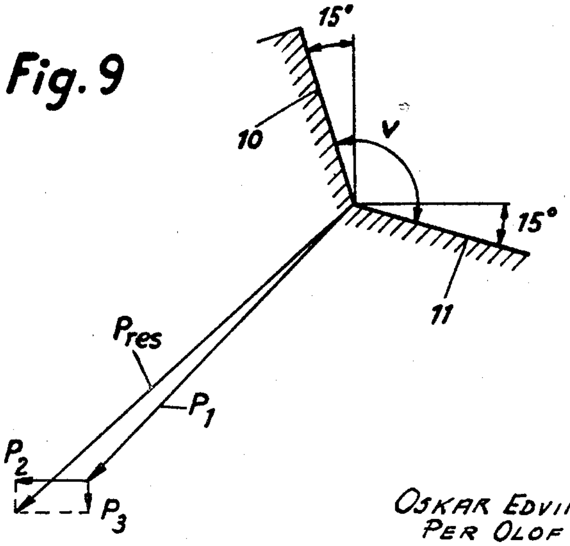

The invention will be further described in connection with the accompanying drawings, where FIG. 1 schematically shows a part of the bracket placed in the recess of the frame according to known forms of embodiment, FIG. 2 shows the same bearing after a great number of bracket operations, FIG. 3 shows a bracket in perspective, FIG. 4 shows a cradle-switch and a bottom plate fastened thereto in perspective, FIG. 5 shows a bearing lining in perspective, FIG. 6 is an assembly drawing showing a cradle-switch for a telephone instrument seen from the side, in which a part of the gable of the frame is broken away, FIG. 7 shows, on a large scale, one bearing of the bracket, FIG. 8 shows from the side schematically and on a large scale the bracket pivoted in the frame and the forces working on the bracket, and FIG. 9, finally, is a diagram which shows the resulting force working in the pivoting point.

In FIGS. 1 and 2 a known embodiment is shown, where 32 indicates the part of the bracket which is pivoted in the recess 33. In FIG. 1 the rocking point for the movement of the bracket is situated at 30. A considerable disadvantage of this form of embodiment is that heavy wear and tear appear at the edge of the bracket and in the recess of the frame when the knife-edge bearing has performed a high number of operations. This is shown in FIG. 2. At the edge of the bracket acting towards the recess a rather wide and deep indentation has been caused due to wear and tear. For the same reason a considerable cavity has formed in the corner of the recess against which the edge of the bracket acts. As a result, the rocking point will be displaced from its original position 30 towards a position 31 situated higher up on the edge of the recess. This causes that the bearing will no longer work satisfactorily. FIG. 3 shows a bracket punched from a piece of sheet metal. The bracket is so formed that by a rocking movement it can transmit the movement that the handset causes on the plungers to a contact spring-set situated in the telephone instrument, which plungers are mounted in the instrument casing. The contact spring-set can be arranged within a case 17 which is partly shown in FIG. 6. The plungers actuate the bracket at the arms 2, and the lifting card 16 (FIG. 6) of the spring-set is actuated at the movement of the bridge. The bracket is pivoted in two bearings in the cradle-switch 6. In the bracket (FIG. 3) there is a rectangular hole 4 punched, the upper edge 4*a* of which forms a bearing surface in one bearing. The edge 5 of the bracket forms the corresponding bearing surface in the second bearing.

The frame 6 and a bottom plate 7 fastened thereto are shown in FIG. 4. In the side branches of the frame there are two punched holes 8, each of which is limited by two diagonal edge lines and a similarly diagonal bottom line (FIG. 6). Each recess 8 is provided with a lining 9 for example of nylon. The inside edges 10 and 11 (FIG. 7) of the linings form the bearing surfaces, which together with said surfaces of the bracket form the bearings of the bracket in the frame. The edges 4*a*, 5 of the bracket are engaged with the recess 8 of the frame by a helicoidal spring 18 (FIG. 6) which with one end point is fastened in a groove 13 in the bracket (FIG. 3), and with the other end point in a wire 14 (FIGS. 4 and 6) at the frame. The movement of the bracket is limited by a recess, which is punched in one side branch of the frame, one side edge (15) (FIG. 6) of said recess forming one end position for the rocking movement of the bracket. Upon movement of the bracket in opposite direction (when replacing the handset) the bracket will never come in contact with the second side edge 26 of the recess, but the rocking is limited by the movement of the plungers blocking a stopping member arranged for this purpose. FIG. 7 shows in detail the active limiting surfaces 10 and 11 of a bearing lining placed in the recess 8 of the frame 6 and a part of one of the edges, for example 5 (FIG. 3), of the bracket 1, which edges rest against the bearing lining. The bearing surfaces 10 and 11 of the lining form with one another the angle $v$. At the point of the angle $v$ the lining is shaped with a rounding with a radius $r_2$, which is chosen greater than the radius $r_1$ of the wane, which is obtained when punching the bracket from the sheet material. By chosing the radius $r_2$ somewhat greater than the radius $r_1$ a certain wear and tear may be allowed on the bracket and also an increase of the radius $r_1$ without deteriorating the pivoting action. This dimensioning of the radii makes it possible for the bracket edge 4*a* respectively 5 to roll in the bearing lining upon the movement of the bracket. In FIG. 8 the bracket 1 is schematically shown placed in the frame 6 and the forces which actuate the bracket. $P_1$ is the force from the helicoidal spring 18, which restores the bracket into inactive position and its acting point on the bracket is situated in point 13. $P_2$ is the force from the contact spring-set and it acts at point 35 of the bracket. $P_3$ is the force which is obtained when replacing the handset and which is necessary for obtaining a torque which overcomes the torque from the force $P_1$ reduced by the torque from the force $P_2$. By placing the helicoidal spring 18 so that its longitudinal axis forms a 45° angle with the vertical axis in FIG. 9 and furthermore by punching the edges of the recesses so that the bearing surfaces 10 and 11 form a circa 15° angle with the vertical respectively horizontal axis, the resultant $P_{res}$ of the forces $P_1$, $P_2$, $P_3$ in the pivoting point acts along a line which is very close to a line bisecting to the angle $v$. The resultant is thus composed of forces from the helicoidal spring, the spring-set and the handset. This is shown in FIG. 9, where the force $P_1$ is removed parallel in reference to the pivoting point and $P_2$ and $P_3$ vectorially are added to $P_1$ for obtaining the resultant $P_{res}$. The helicoidal spring 18 acts certainly with varying moment arm during the rocking moment of the bracket, but the moments from the forces $P_2$ and $P_3$ will also vary during the movement, and therefore the resultant $P_{res}$ will turn from a first end position where it forms a certain small angle with the bisector, to a second end position on the other side of the bisector, where the angle between the resultant and the bisector also is small.

By the previously mentioned selection of the relation between the radii $r_1$ and $r_2$ and by placing of the helicoidal spring so that the direction of the resultant will practically coincide with the bisector to the angle $v$, there are conditions for the bracket surely to roll in the bearing and thus not carry out any gliding motion. As example of values for the two above stated radii $r_1$ and $r_2$, $r_1$=0.10–0.15 millimeter and $r_2$=0.30 millimeter may be stated. Since the bearing linings can be produced as separate elements, the demands on surface fineness of the recesses made in the plate will be relatively small in relation to the solution to let the bracket edge act directly in the recess of the frame. Further advantages are obtained when using bearing linings because the bearing length can be increased beyond merely the thickness of the sheet material in the recess of the frame since the lining straddles the sheet material on both sides. The bearing linings are furthermore easy to mount. Above has been stated that the wane of the sheet which is obtained by punching the sheet material is used at the parts of the edges 4*a*, 5 of the bracket which form bearings. Any extra machining in order to obtain a rounding of the edge is therefore not required. In case the punching of the sheet material should not produce such a wane, the edge may be given the required rounding by some other simple machining.

We claim:

1. A cradle switch assembly for a telephone instrument having a telephone handset and a set of contact springs controlling the signal and speech connections in the instrument, said switch assembly comprising a frame structure, a bracket for resting thereupon the handset of the instrument, knife-edged bearing means pivotally supporting said bracket on the frame structure, the pivotal position of the bracket controlling the relative positions of said contact springs against the spring action thereof, said bearing means comprising a wall portion on the bracket having a rounded bearing edge and a wall portion on the bracket having a bearing notch therein, said bearing notch being defined by two convergent lateral sides and a substantially flat base, one of said sides being joined to the base by a rounded edge having a radius of curvature larger than the radius of curvature of the rounded bearing edge, and spring means urging said rounded bearing edge against said rounded edge of the bearing notch.

2. A cradle switch assembly for a telephone instrument having a telephone handset and a set of contact springs controlling the signal and speech connections in the instrument, said switch assembly comprising a frame structure, a bracket for resting thereupon the handset of the instrument, knife-edged bearing means pivotally supporting said bracket on the frame structure, the pivotal position of the bracket controlling the relative positions of said contact springs against the spring action thereof, said bearing means comprising a wall portion on the bracket and a rounded bearing edge, and a bearing lining fitted upon a wall portion of the frame structure, said lining forming a bearing notch defined by two convergent lateral sides and a substantially flat base, one of said sides being joined to the base by a rounded edge having a radius of curvature larger than the radius of curvature of the rounded bearing edge, and spring means urging said rounded bearing edge against said rounded edge of the lining.

3. A cradle switch assembly for a telephone instrument having a telephone hand set and a set of contact springs controlling the signal and speech connections in the instrument, said switch assembly comprising a frame structure, a bracket for resting thereupon the handset of the instrument, knife-edged bearing means pivotally supporting said bracket on the frame structure, the pivotal position of the bracket controlling the relative positions of said contact springs against the spring action thereof, said bearing means comprising a wall portion on the bracket having a rounded bearing edge and a wall portion on the bracket having a bearing notch therein, said bearing notch being defined by two convergent lateral sides and a substantially flat base, one of said sides being joined to the base by a rounded edge having a radius of curvature larger than the radius of curvature of the rounded bearing edge, and spring means urging said rounded bearing edge of the bracket against said rounded edge of the bearing notch on the frame structure, the vector of the resultant force acting upon the bracket and composed of the force of said spring means, the weight of the handset upon the bracket and the spring force of said set of contact springs being in an angular direction approximately coinciding with the angular direction of a line bisecting the angle defined by said one notch side and the notch base joined by said rounded edge in the notch.

4. A cradle switch assembly for a telephone instrument having a telephone handset and a set of contact springs controlling the signal and speech connections in the instrument, said switch assembly comprising a frame structure, a bracket for resting thereupon the handset of the instrument, knife-edged bearing means pivotally supporting said bracket on the frame structure, the pivotal position of the bracket controlling the relative positions of said contact springs against the spring action thereof, said bearing means comprising a wall portion on the bracket having a rounded bearing edge and a bearing lining fitted upon a wall portion of the frame, said lining forming a bearing notch defined by two convergent lateral sides and a substantially flat base, one of said sides joining the base by a rounded edge having a radius of curvature larger than the radius of curvature of the rounded bearing edge, and spring means urging said rounded bearing edge of the bracket against said rounded edge of the lining, the vector of the resultant force acting upon the bracket and composed of the force of said spring means, the weight of the handset resting upon the bracket and the spring force of said set of contact springs being in an angular direction approximately coinciding with the angular direction of a line bisecting the angle defined by said one notch side and the base joined by said rounded edge of the lining.

5. A cradle switch assembly according to claim 1, wherein said frame structure and said bracket are made of sheet metal, said rounded bearing edge being formed at the end of a wall portion extending from the bracket.

6. A cradle switch assembly according to claim 2, wherein said bearing lining comprises a generally saddle-shaped member having depending flanges straddling a wall portion of the frame structure.

7. A cradle switch assembly according to claim 1, wherein said spring means comprises a helical spring secured at one end to the bracket and at the other end to the frame structure.

8. A cradle switch assembly according to claim 1, wherein two spaced-apart wall portions of the frame structure, each having a rounded bearing edge, and two corresponding bearing notches in the frame structure are provided, and wherein said spring means comprises a helical spring secured at one end to the bracket and at the other end to the frame structure and disposed between said two rounded bearing edges and the corresponding bearing notches.

No references cited.